United States Patent [19]
Takahashi

[11] Patent Number: 5,960,121
[45] Date of Patent: Sep. 28, 1999

[54] IMAGE PROCESSING APPARATUS FOR REDUCING IMAGE NOISE

[75] Inventor: Yuji Takahashi, Chigasaki, Japan

[73] Assignee: Ricoh Company, Ltd., Tokyo, Japan

[21] Appl. No.: 08/616,461

[22] Filed: Mar. 15, 1996

[30] Foreign Application Priority Data

Mar. 28, 1995 [JP] Japan ................................. 7-070188

[51] Int. Cl.⁶ .............................. G06K 9/40; H04N 1/40
[52] U.S. Cl. ...................... 382/260; 382/266; 382/270; 358/448; 358/466
[58] Field of Search .................................. 382/260, 266, 382/237, 270; 358/448, 465, 466, 464

[56] References Cited

U.S. PATENT DOCUMENTS

| | | | |
|---|---|---|---|
| 4,876,610 | 10/1989 | Ohsawa et al. | 382/266 |
| 5,452,107 | 9/1995 | Koike | 358/456 |

*Primary Examiner*—Thomas D. Lee
*Attorney, Agent, or Firm*—Oblon, Spivak, McClelland, Maier & Neustadt, P.C.

[57] ABSTRACT

Image data scanned by a scanner in a digital scanner, a digital copying machine or a facsimile machine is processed to detect an edge despite low contrast. A first MTF compensation portion enhances an edge area of the image data. An edge detector detects edge data from the first PTF co pensation portion. A second MTF compensation portion enhances the edge data from the equalization filter. An equalization filter calculates a binary cut-off level for input data. Another edge detector functions as a device for detecting edge data from the equalization filter by a Laplacian filter. Clamp circuits clamp a highest limit and a lowest limit of the binary cut-off level of signals from the equalization filter. A first comparator compares an output signal from the MTF compensation portion to an output signal from one of the clamp circuits. A second comparator compares an output signal from the first equalization filter to an output signal from the other clamp circuit. A first selector selects data from the first comparator or data from the second comparator in response to an edge signal from the edge area detector. A third comparator compares a output signal from another edge detector to a parameter select signal. A second selector selects either data from the first selector or a null signal in response to an output signal of the second comparator. A binary filter eliminates isolated specks in the background.

6 Claims, 6 Drawing Sheets

|   | -2 |   |
|---|----|---|
| -2 | 9 | -2 |
|   | -2 |   |

*FIG. 2A*

|   | -1 |   |
|---|----|---|
| -1 | 5 | -1 |
|   | -1 |   |

*FIG. 2B*

|   |   |   |
|---|---|---|
|   | 1 |   |
|   |   |   |

*FIG. 2C*

| 1/2 | 1 | 1/2 |
|-----|---|-----|
| 1   | 2 | 1   |
| 1/2 | 1 | 1/2 | x1/8

*FIG. 3A*

| 1/2 | 0 | 1 | 0 | 1/2 |
|-----|---|---|---|-----|
| 1   | 0 | 2 | 0 | 1   |
| 1/2 | 0 | 1 | 0 | 1/2 | x1/8

*FIG. 3B*

| 0    | -1/4 | 0    |
|------|------|------|
| -1/4 | 2    | -1/4 |
| 0    | -1/4 | 0    |

*FIG. 4A*

| 0    | 0 | -1/4 | 0 | 1/2  |
|------|---|------|---|------|
| -1/4 | 0 | 2    | 0 | -1/4 |
| 0    | 0 | -1/4 | 0 | 0    |

*FIG. 4B*

| 1 | 1 | 1 | 1 | 1 |
|---|---|---|---|---|
| 1 | 1 | 2 | 1 | 1 |
| 1 | 1 | 1 | 1 | 1 | x1/16

*FIG. 5*

| -1 | 0 | 1 | 0 | -1 |
|----|---|---|---|----|
| -1 | 0 | 8 | 0 | -1 |
| -1 | 0 | 1 | 0 | -1 |

*FIG. 6*

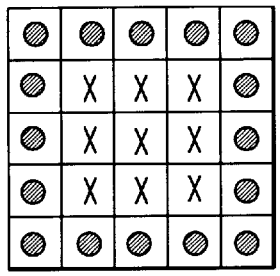
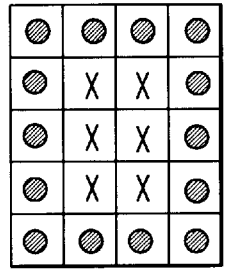
*FIG. 7A*  *FIG. 7B*
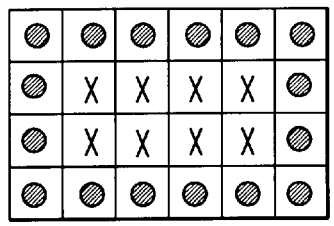
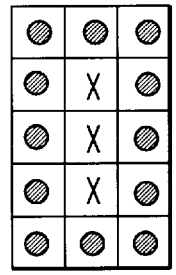
*FIG. 7C*  *FIG. 7D*
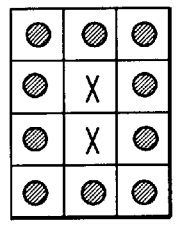
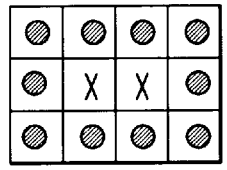
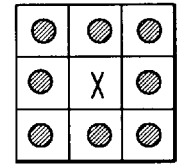
*FIG. 7E*  *FIG. 7F*  *FIG. 7G*

IMAGE PROCESSING APPARATUS FOR REDUCING IMAGE NOISE

BACKGROUND OF THE INVENTION

1. Field of the Invention

The present invention relates to an integrated image processing apparatus for processing image data scanned by a scanner in a digital scanner, a digital copying machine or a facsimile machine, and more particularly to an integrated image processing apparatus for reducing image noise on image data that is of low density and low contrast so that image characters are reproduced well on their background.

2. Discussion of the Background

Image data scanned by a scanner in a digital scanner, a digital copying machine or a facsimile machine is usually processed, for example, in a dither process for a photograph image, a moire deducing process for halftone images or an MTF (Modulation Transfer Function) compensation process for line images.

In case an original image is mixed with a fine line image, e.g., a character, and a halftone image, e.g., a photograph, another process to find an edge of the image is required. One of the known processes is shown as Japanese Patent Application (KOUKOKU) 6-14352. In this process, the edge of image is found by binary data converted using a cut-off level.

Another background image processing apparatus is shown as Japanese Laid-Open Patent Application (KOKAI) 4-220080. In this process, the cut-off level can be changed by an average of the image data.

In the foregoing image processing apparatuses, a binary cut-off level is established for discriminating between a character (black region) and a background (white region). However, as the cut-off level is fixed, the problem arises that the quality of the reproduced image depends on the quality of the original image. For example, the background of the character may be dark or there may be a white blank or an isolated black speck, which may cause the fixed cut-off level to produce erroneous output.

In case of combining known image processing techniques, there arise problems of complicating the structure of the apparatus used, or slowing down the speed of the process.

SUMMARY OF THE INVENTION

In view of the foregoing drawbacks in background image processing, one object of the present invention to provide a novel image processing apparatus having good edge recognition.

In accordance with the present invention, this object of the present invention is attained by a novel image processing apparatus which equalization means for calculating a cut off level for making image data binary; clamp means for fixing a highest limit of said cut-off level and a lowest limit of said cut-off level; first comparator means for outputting said image data made binary using said highest limit and said lowest limit; emphasizing means for emphasizing and processing an edge area of said image data; second comparator means for outputting said emphasized image data made binary using said highest limit and said lowest limit; detecting means for detecting an edge area of a white area of an input image data; and selection means for selecting either one of said binarized image data and said binarized emphasized image data as first output image data on the basis of said detecting means.

This invention may be conveniently implemented using a conventional general purpose digital computer program according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs, RAMs, EPROMS, REPROMs, magnetic or optical cards, or any type of media suitable for storing electronic instructions.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein:

FIGS. 2(a)–2(c) show matrix filters used in the first MTF compensation portion;

FIG. 3(a) and 3(b) show matrix filters used in the equalization filter;

FIG. 4(a) and 4(b) show matrix filters used in the second MTF compensation portion;

FIG. 5 shows a matrix filter used in the second equalization filter;

FIG. 6 shows a matrix filter used in the edge selectivity portion;

FIG. 7(a)–7(g) show matrix filters used in the edge selectivity portion;

Figures 8A, 8B, 8C, 8D, 8E, 8F, 8G:
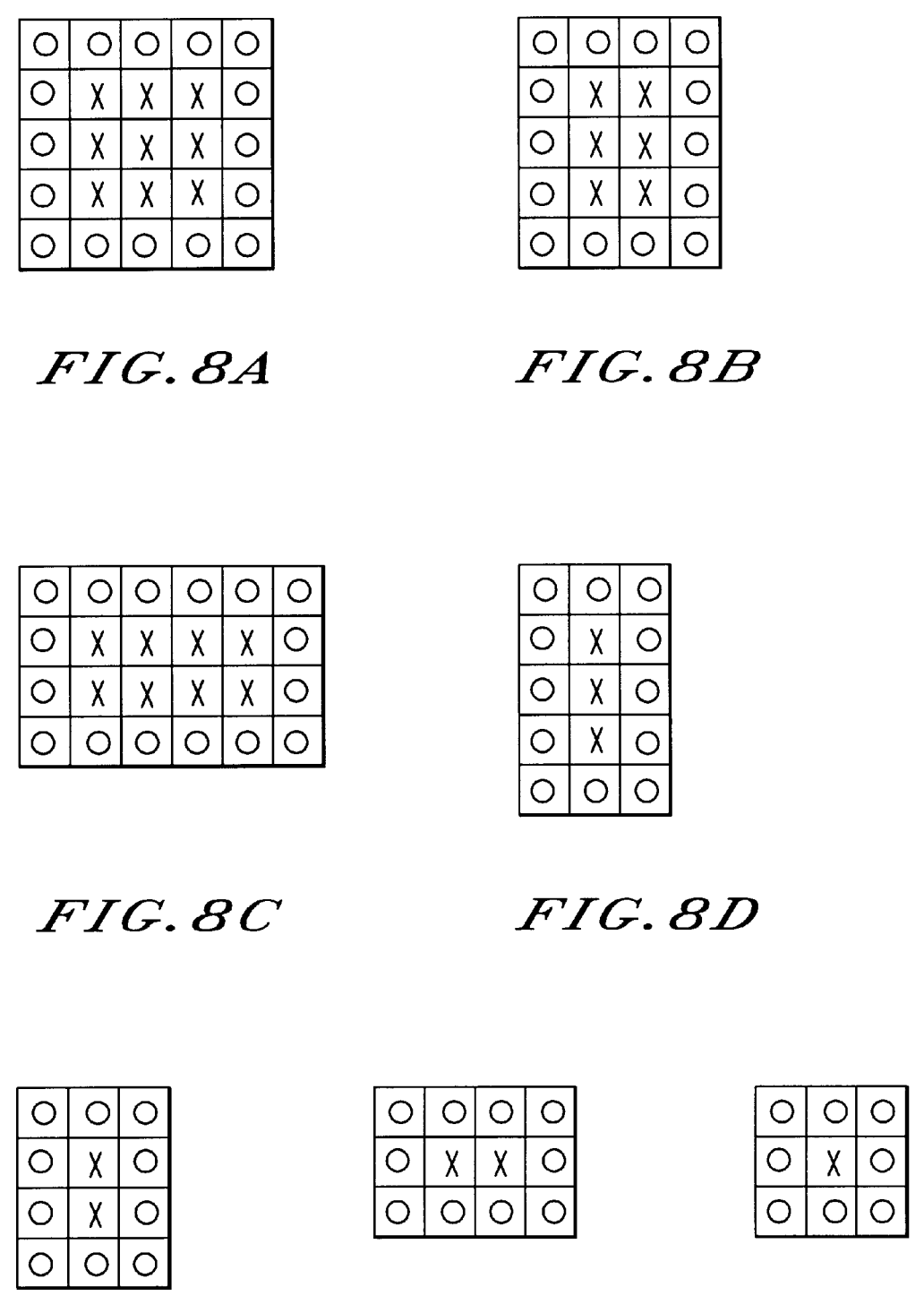

FIG. 8(a)–8(g) show another matrix filter used in the edge selectivity portion;

FIG. 9(a)–9(g) show matrix filters used in the edge selectivity portion;

DETAILED DESCRIPTION OF THE PREFERRED EMBODIMENTS

Figure 1:
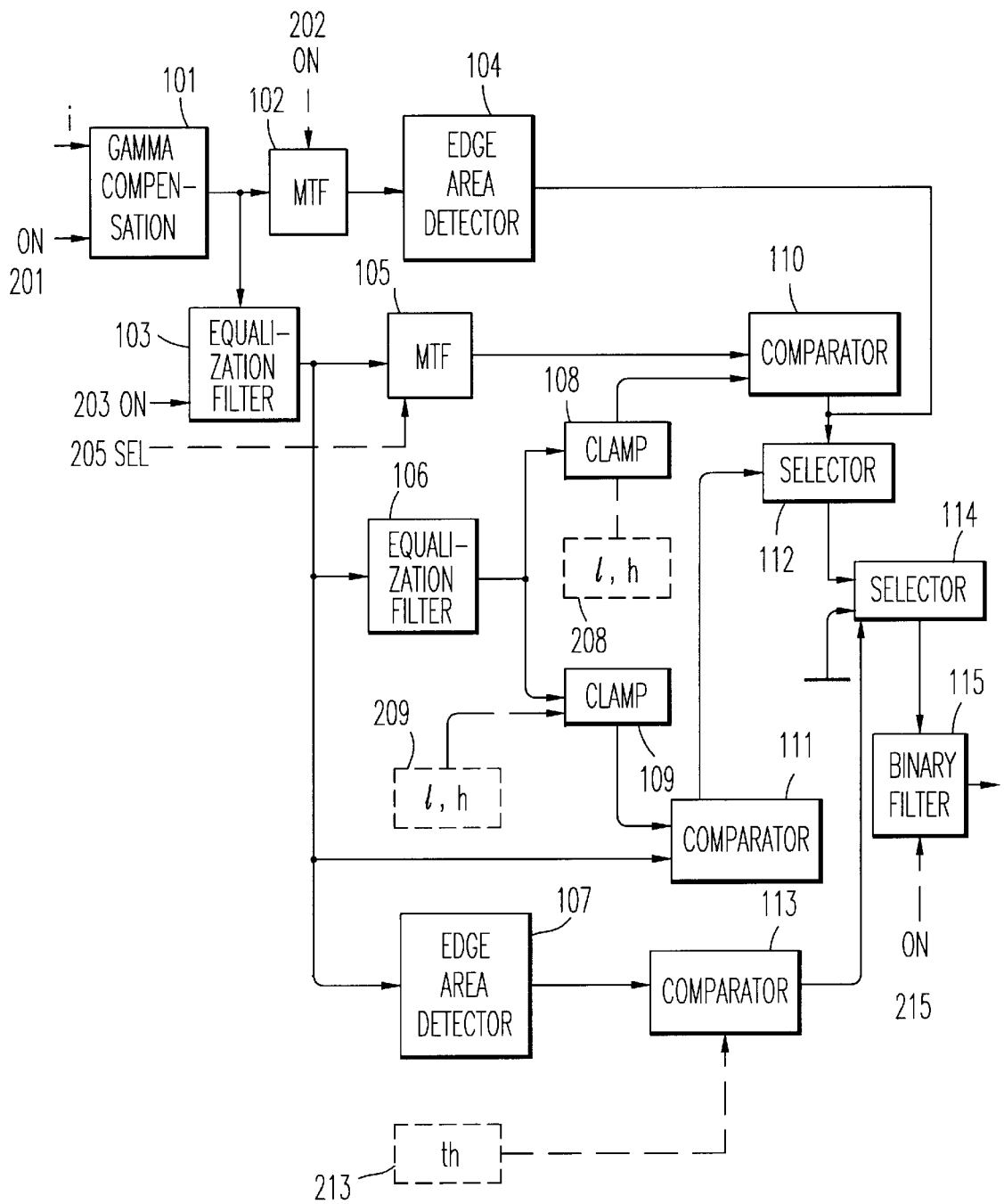
FIG. 1 shows an embodiment of the present invention.
Figure 9A:
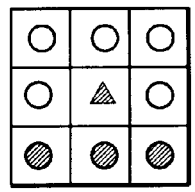
Figure 9B:
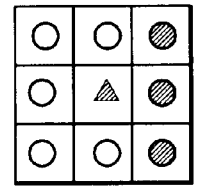
Figure 9C:
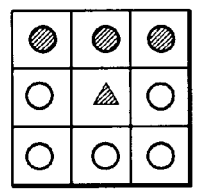
Figure 9D:
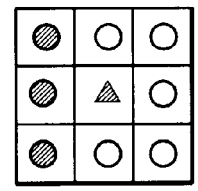
Figure 10A:
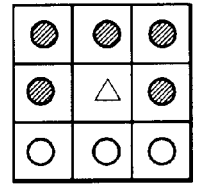
FIG. 10(a)–10(d) show matrix filters used in the edge selectivity portion.
Figure 10B:
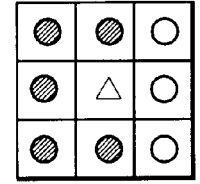
Figure 10C:
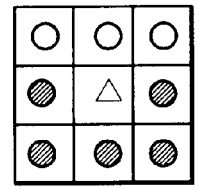
Figure 10D:
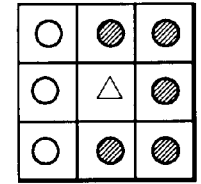

Referring now to the drawings, wherein like reference numerals designate identical or corresponding parts throughout the several views, and more particularly to FIG. 1 thereof, one embodiment of the present invention is now described in further detail.

FIG. 1 is a schematic presentation in block form of a preferred embodiment of the invention. A gamma compensation portion 101 performs gamma compensation on input image data i scanned by a scanner in a digital scanner, a digital copying machine or a facsimile machine.

A first MTF compensation portion 102 performs MTF compensation for enhancing an edge area of the image data from the gamma compensation portion 101 for detecting the edge area. A first edge area detector 104 functions as a device for detecting, by a pattern matching, an edge area of the input image whose edge area data is enhanced by the first MTF compensation portion 102. It outputs a binary signal indicative of the presence of an edge when the scanning data signal transitions from a black area (character) to a light area (background).

A first equalization filter 103 functions as a smoothing device for smoothing and reducing image noises of the input digital image data from the gamma compensation portion 101 slightly or for eliminating any moire pattern. A second MTF compensation portion 105 functions as a device for enhancing the edge area of the image data from the equalization filter 103 so that the image is reproduced well. That is, if the scanning data reaches an edge area before transitioning to the background, it is enhanced at second MTF compensation portion 105.

A second equalization filter 106 provides a greater degree of smoothing for the data already smoothed by the first equalization filter 103 and functions as a device for defining a binary cut-off level for data from the equalization filter 103. That is, the curve of the smoothed data from the second equalization filter 106 establishes the signal strength for discriminating between a binary level indicating a character and a binary level indicating a background.

Since the output of the second equalization filter 106 may not be constant, clamp circuits 108 and 109 clamp between a highest limit (h) and a lowest limit (1) of the binary cut-off level of signals from the second equalization filter 106. Thus, the cut-off level outputted from clamp circuits 108 and 109 is not fixed but depends upon the smoothed value of the signal indicative of a character.

A first comparator 110 functions as a device for comparing an enhanced output signal from the MTF compensation portion 105 to an output signal from the binary clamp circuit 108. It outputs a binary signal based upon whether the output from the MTF compensation portion 105 is greater or less than the clamped signal from the binary clamp circuit 108, and so this binary signal depends upon the smoothed value outputted by the second equalization filter 106.

A second comparator 111 functions as a device for comparing an unenhanced output signal from the first equalization filter 103 to an output signal from the clamp circuit 109. A first selector 112 functions as a device for selecting data from the first comparator 110 or data from the second comparator 111 in response to an output signal from the edge area detector 104. For example, the signal from comparator 110 is selected when the edge area detector 104 detects the presence of an edge.

A second, or white region, edge area detector 107 functions as a device for detecting an edge area of the image data from the equalization filter 103 by use of a Laplacian filter. A third comparator 113 compares an output signal from the second edge area detector 107 to a parameter select signal "th" from a parameter select signal generator 213. It outputs a binary signal indicative of the presence of an edge when transitioning from a light area to a black area.

A second selector 114 selects binary data from the first selector 112 or a white signal not based upon image data in response to an output signal of the second comparator 113.

A binary filter 115 functions as a data compensation device for eliminating any isolated specks in the image background.

In use, the input image data i is digital data converted to 8 bit data from a data scanned by scanner in the digital scanner, the digital copying machine or the facsimile machine. The input image i is first compensated for density by the gamma compensation portion 101. It is then split and inputted to the first MTF compensation portion 102 and the edge area detector 104 for detecting the edge area of the image, and to the binary equalization filter 103.

MTF compensation for enhancing an edge area of the image data for detecting the edge area in the first MTF compensation portion 102 is initiated by a parameter select signal 202, and is not operated (no parameter select signal) in the case where the original image has many background parts. A filter which may be used in the first MTF compensation portion 102 operates as shown in FIG. 2($a$)–2($c$).

In the gamma compensation portion 101, the number of bits of the image data may be reduced. The gamma compensation will be not operated in the absence of a parameter select signal 201. In the case that where image data has many image noises in the background area, the parameter select signal 201 is not outputted and the gamma compensation is reduced in low density areas so that the image noise is not selected as an edge area.

In the edge area detector 104, an edge area of the image data is detected by pattern matching. For example, the pattern matching may use the algorithm disclosed in Japanese Laid-Open Patent Application (KOKAI) 4-248766. The pattern matching may be adjusted for low density edge areas.

The equalization filter 103 is operated by a parameter select signal 203. The image data is smoothed in the equalization filter 103, for reducing image noise of the input digital image data slightly or for eliminating moire patterns, using a matrix filter which functions as shown in FIG. 3($a$)–3($b$), for example. Some image data may be smoothed.

In the second MTF compensation portion 105, the image data from the equalization filter 103 has its edge area enhanced, in response to parameter select signal 205, using a matrix filter which operates as shown in FIG. 4($a$)–4($b$).

In the second equalization filter 106, a average is calculated using a matrix filter which functions as shown in FIG. 5. The average is using as a cut-off level for binarizing data. The cut-off level may therefore be tailored to the image characteristics and is less likely to produce erroneous results.

In the clamp circuits 108 and 109, the cut off level outputted from 106 is clamp under a highest limit "h" and over a lowest limit "1" by parameter select signals "1" and "h" from signal generators 208 and 209. These limits are set to reproduce the density range of both an edge area and a nonedge area.

In the first comparator 110, output data from the MTF compensation portion 105 is made binary by the clamped cut-off level output from the clamp circuit 108. In the second comparator 111, output data directly from equalization filter 103 without processing through the MTF compensation portion 105 is made binary by the clamped cut-off level output from the clamp circuit 109.

Then the first selector 112 either selects output data from the first comparator 110 for edge area or from the second comparator 111 for non-edge area based upon an output signal from the edge selectivity portion 104, wherein the image data of an edge area is compensated by MTF whereas the image data of a non-edge area is not compensated by MTF. It is thus possible to enhance edge data and discriminate between the enhanced edge data and the character data.

In the white edge detector 107, unenhanced output data from the first equalization filter 103 is detected as an edge area when transitioning from a white area of the image data by a Laplacian filter in a manner such as that shown in FIG. 6. In the third comparator 113, an output signal from the white edge detector portion 107 is compared to a parameter select signal "th" from signal generator 213, and a binary signal indicative of a white (background) area is outputted when under the parameter select signal level "th".

In the second selector 114, output data from the first selector 112 is outputted if the output signal from the comparator 113 indicates that the character edge has been reached, and a null output indicating a white area is outputted in response to an output signal from the second comparator 113 that no edge has been detected. It is therefore possible to determine with greater certainty the presence of a scanned edge even where there is a low contrast between a character and the background.

In the binary filter 115, an isolated speck is reduced in the background area in response to parameter select signal 215. Noise selected as an edge in the edge selectivity portion 104 is thus reduced.

In FIG. 7(a)–7(g), "⊙" indicates a black dot, "x" indicates any other data. In case that black dot data matches in any patterns such as those of FIG. 7(a)–FIG. 7(g), "x" is changed into a black dot In FIG. 8(a)–8(g), "○" indicates a white dot, "x" indicates any other data. In case that white dot data matches in any patterns such as those of FIG. 8(a)–FIG. 8(g), "x" is changed into a white dot In FIG. 9(a)–9(d), in case that the black "Δ" is a black dot, the black "Δ" is changed to white dot.

In FIG. 10(a)–10(d), in case that a white "Δ" is a white dot, the white "Δ" is changed to a black dot.

Figure 11:
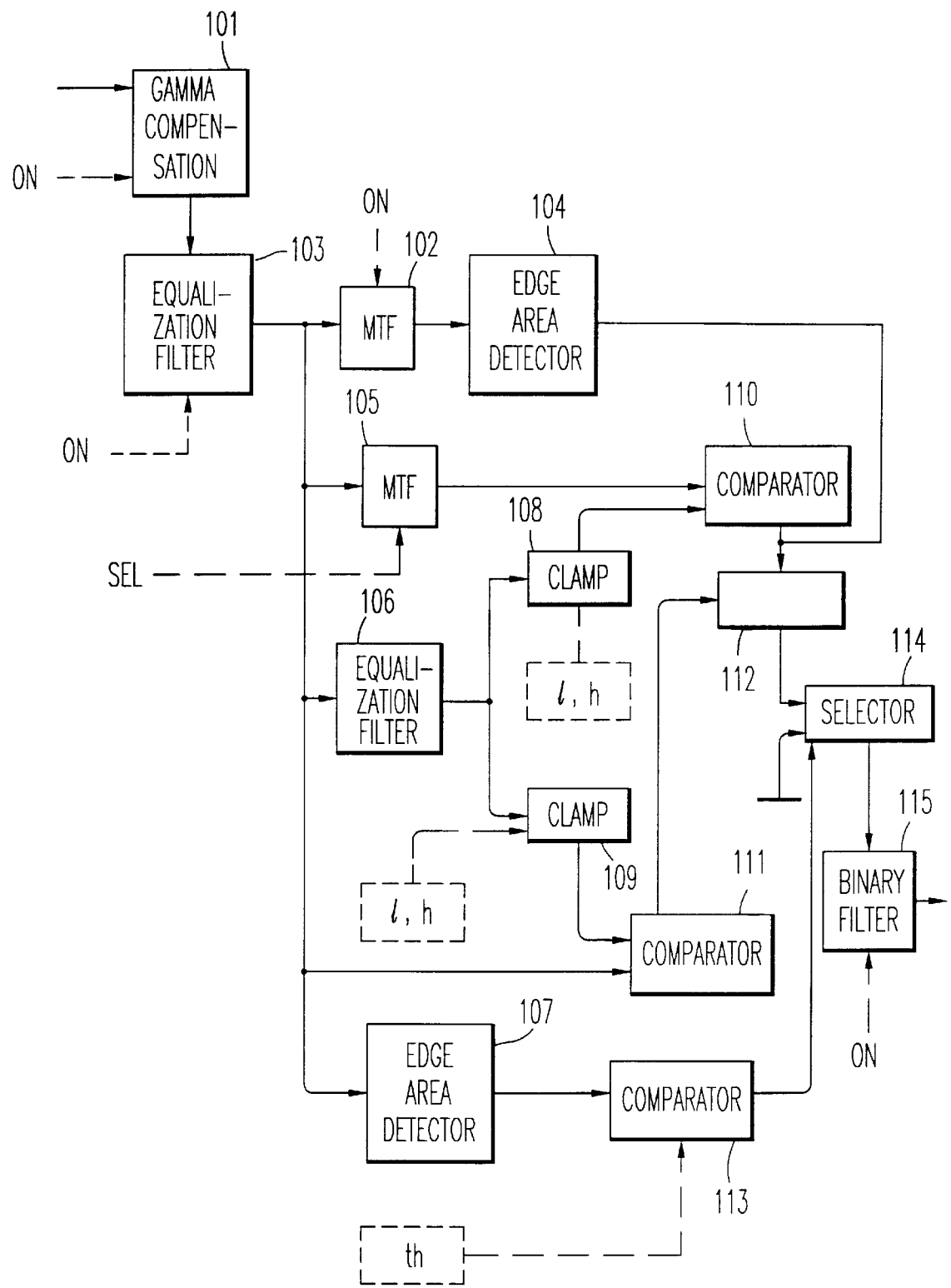
FIG. 11 shows another embodiment of the present invention.

FIG. 11 shows another embodiment of the present invention in which is the same as the first embodiment except that the equalization filter 103 is moved front of the first MTF compensation portion 102.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image processing apparatus comprising:

equalization means for receiving input image data and defining a binary cut-off level for input image data of a given pixel;

clamp means for clamping said binary cut-off level between a highest limit of said cut-off level and a lowest limit of said cut-off level;

first comparator means for receiving said input image data, comparing said image data to the clamped cut-off level, binarizing said data according to said cut-off levels, and providing binarized image data;

enhancing means for enhancing said input image data, and providing enhanced image data;

second comparator means for comparing said enhanced image data to said clamped cut-off level, binarizing said enhanced image data according to said cut-off levels, and providing binarized enhanced image data;

first detecting means for detecting an edge area of a black area of said input image data; and selection means for selecting, as a first output image data, said binarized image data, when an edge area is not detected by said detecting means and said binarized enhanced image data when an edge area is detected by said detecting means.

2. The image processing apparatus according to claim 1, further comprising:

second detecting means for detecting an edge area of a white area of said smoothed image data;

third comparator means for comparing the outputting binary data from said second detecting means to a predetermined limit and outputting second output data; and second selection means for selecting said first output image data from said first selecting means or a white image signal on the basis of a result of said second detecting means.

3. The image processing apparatus according to claim 2, further comprising compensation means for reducing data corresponding to an isolated speck in the edge area.

4. The image processing apparatus according to claim 3, further comprising smoothing means for smoothing and processing image data of a noticeable pixel on the basis of peripheral pixels of the noticeable pixel.

5. The image processing apparatus according to claim 2, further comprising smoothing means for smoothing and processing image data of a noticeable pixel on the basis of peripheral pixels of the noticeable pixel.

6. The image processing apparatus according to claim 1, further comprising smoothing means for smoothing and processing image data of a noticeable pixel on the basis of peripheral pixels of the noticeable pixel.

* * * * *